US010111212B2

(12) United States Patent
Ehsan et al.

(10) Patent No.: US 10,111,212 B2
(45) Date of Patent: Oct. 23, 2018

(54) UE-INITIATED DYNAMIC ACTIVATION AND DE-ACTIVATION OF SECONDARY CARRIERS

(71) Applicant: Qualcomm Incorporated, San Diego, CA (US)

(72) Inventors: Navid Ehsan, San Diego, CA (US); Thomas Klingenbrunn, San Diego, CA (US); Amir Aminzadeh Gohari, San Diego, CA (US); Aziz Gholmieh, San Diego, CA (US); Alexei Yurievitch Gorokhov, San Diego, CA (US); Masato Kitazoe, Tokyo (JP); Amit Mahajan, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 361 days.

(21) Appl. No.: 13/749,518

(22) Filed: Jan. 24, 2013

(65) Prior Publication Data

US 2013/0194947 A1 Aug. 1, 2013

Related U.S. Application Data

(60) Provisional application No. 61/591,237, filed on Jan. 26, 2012.

(51) Int. Cl.
  *H04W 72/04* (2009.01)
  *H04W 24/10* (2009.01)
  *H04L 5/00* (2006.01)

(52) U.S. Cl.
  CPC ......... *H04W 72/0413* (2013.01); *H04L 5/001* (2013.01); *H04L 5/0035* (2013.01);
  (Continued)

(58) Field of Classification Search
  CPC ............ H04W 28/20; H04W 74/0413; H04W 72/413; H04W 24/10; H04L 5/001;
  (Continued)

(56) References Cited

U.S. PATENT DOCUMENTS

| 8,743,720 B2 * | 6/2014 | Lee et al. ...................... 370/252 |
| 2009/0161545 A1 * | 6/2009 | Ho ........................ H04L 47/225 370/235 |

(Continued)

FOREIGN PATENT DOCUMENTS

| CN | 102088433 A | 6/2011 |
| CN | 102293046 A | 12/2011 |

(Continued)

OTHER PUBLICATIONS

Ericsson et al: "Rel-10 UE capabilities", 3GPP Draft; R2-110496 REL-10 UE Capabilities, 3rd Generation Partnership Project (3GPP), Mobile Competence Centre ; 650, Route Des Lucioles; F-06921 Sophia-Antipolis Cedex ; France, vol. RAN WG2, No. Dublin, Ireland; Jan. 17, 2011, Jan. 18, 2011 (Jan. 18, 2011), XP050493093, [retrieved on Jan. 18, 2011].

(Continued)

*Primary Examiner* — Jianye Wu
(74) *Attorney, Agent, or Firm* — Norton Rose Fulbright US LLP

(57) ABSTRACT

Managing of secondary carriers for a multicarrier user equipment (UE) is described in which the UE initiates or provides input for activation and deactivation of selected secondary cells in a carrier aggregation depending on allocation or provisioning of UE radio frequency resources.

16 Claims, 12 Drawing Sheets

(52) U.S. Cl.
CPC ........... *H04L 5/0098* (2013.01); *H04W 24/10* (2013.01); *H04L 5/006* (2013.01); *H04L 5/0044* (2013.01)

(58) Field of Classification Search
CPC ... H04L 5/0098; H04L 5/0035; H04L 5/0044; H04L 5/006
See application file for complete search history.

(56) References Cited

U.S. PATENT DOCUMENTS

| | | | |
|---|---|---|---|
| 2010/0284333 A1 | 11/2010 | Shirota et al. | |
| 2011/0269453 A1 | 11/2011 | Ranta-Aho et al. | |
| 2012/0113831 A1* | 5/2012 | Pelletier | H04L 5/0053 370/252 |
| 2012/0176926 A1* | 7/2012 | Jang | H04W 24/02 370/252 |
| 2012/0257570 A1* | 10/2012 | Jang | H04W 76/19 370/328 |
| 2013/0012186 A1* | 1/2013 | Kim | H04L 5/0098 455/418 |
| 2013/0136094 A1* | 5/2013 | Wei | 370/329 |
| 2013/0287139 A1* | 10/2013 | Zhu | H04N 21/2365 375/295 |

FOREIGN PATENT DOCUMENTS

| | | |
|---|---|---|
| EP | 2388944 A1 | 11/2011 |
| EP | 2398285 A1 | 12/2011 |
| WO | WO-2010074204 A1 | 7/2010 |
| WO | 2010101510 A2 | 9/2010 |
| WO | WO-2011085270 A1 | 7/2011 |
| WO | WO-2011119003 A2 | 9/2011 |

OTHER PUBLICATIONS

Ericsson et al: "UE DRX for 4C-HSDPA", 3GPP Draft; R1-102622 UE DRX for 4C-HSDPA, 3rd Generation Partnership Project (3GPP), Mobile Competence Centre ; 650, Route Des Lucioles ; F-06921 Sophia-Antipolis Cedex ; France, vol. RAN WG1, No. Montreal, Canada; May 10, 2010, May 4, 2010 (May 4, 2010), XP050419839, [retrieved on May 4, 2010].

International Search Report and Written Opinion—PCT/US2013/023163—ISA/EPO—dated Aug. 9, 2013.

ITRI: "RF Receiver Information in UE Capability Signalling", 3GPP Draft; R2-110356_Receiver Information in UE Capability Signalling, 3rd Generation Partnership Project (3GPP), Mobile Competence Centre ; 650, Route Des Lucioles ; F-06921 Sophia-Antipolis Cedex ; France, vel. RAN WG2, No. Dublin, Ireland; Jan. 21, 2011, Jan. 11, 2011 (Jan. 11, 2011), XP050605601.

Nokia Corporation et al: "UE capability signaling for CA and MIMO in REL10", 3GPP Draft; 36331_CR0528_(REL-10)_R2-106934 UE Capability Signaling for CA and MIMO in REL10, 3rd Generation Partnership Project (3GPP), Mobile Competence Centre; 650, Route Des Lucioles; F-06921 Sophia-Antipolis Cedex; France, vol. RAN WG2, No. Jacksonville, USA; Jan. 15, 2010, Nov. 28, 2010 (Nov. 28, 2010), XP050492645, [retrieved on Nov. 28, 2010].

Partial International Search Report—PCT/US2013/023163—ISA/EPO—dated Jun. 7, 2013.

* cited by examiner

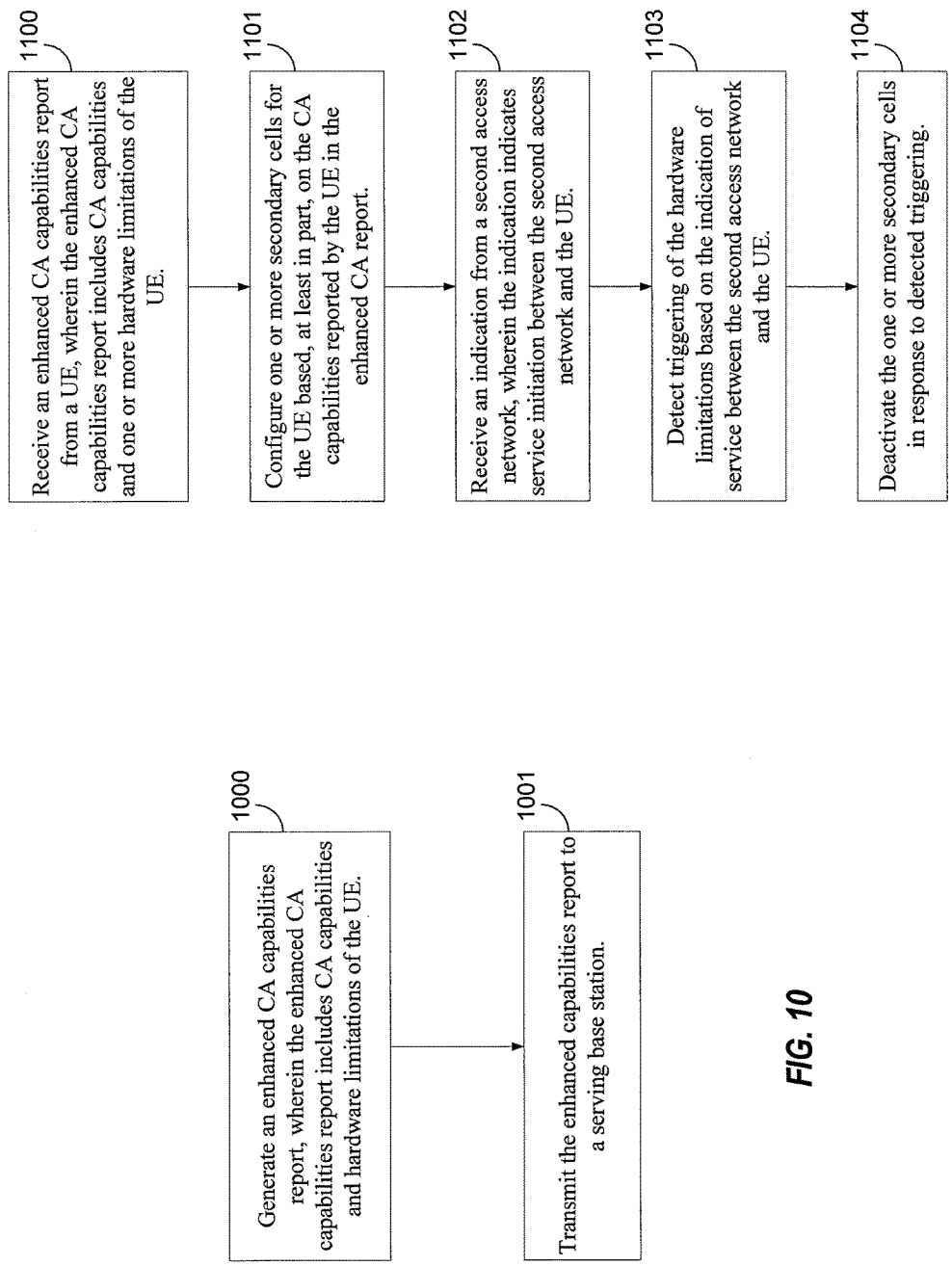

UE-INITIATED DYNAMIC ACTIVATION AND DE-ACTIVATION OF SECONDARY CARRIERS

CROSS-REFERENCE TO RELATED APPLICATIONS

This application claims the benefit of U.S. Provisional Patent Application No. 61/591,237, entitled, "UE-INITIATED DYNAMIC ACTIVATION AND DE-ACTIVATION OF SECONDARY CARRIERS", filed on Jan. 26, 2012, which is expressly incorporated by reference herein in its entirety.

BACKGROUND

Field

Aspects of the present disclosure relate generally to wireless communication systems, and more particularly, to user equipment (UE)-initiated dynamic activation and de-activation of secondary carriers.

Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of eNodeBs that can support communication for a number of user equipments (UEs). A UE may communicate with an eNodeB via the downlink and uplink. The downlink (or forward link) refers to the communication link from the eNodeB to the UE, and the uplink (or reverse link) refers to the communication link from the UE to the eNodeB.

SUMMARY

Aspects of the present disclosure are directed to a method for wireless communication that includes determining, at a UE, to re-provision one or more of a plurality of radio frequency (RF) processing chains of the UE, generating an activation message, wherein the activation message includes activation request information regarding one or more secondary cells configured for the UE, and transmitting the activation message to a serving base station.

Additional aspects of the present disclosure are directed to a method for wireless communication including receiving, at a base station, an activation message from a UE, wherein the activation message includes activation request information regarding one or more secondary cells configured for the UE, and modifying a state of the one or more secondary cells in response to the activation request information.

Additional aspects of the present disclosure are directed to a method for wireless communication including generating, at a UE, an enhanced CA capabilities report, wherein the enhanced CA capabilities report includes CA capabilities of the UE and hardware limitations of the UE, and transmitting the enhanced capabilities report to a serving base station.

Additional aspects of the present disclosure are directed to a method for wireless communication including receiving, at a base station of a first access network, an enhanced CA capabilities report from a UE, wherein the enhanced CA capabilities report includes CA capabilities of the UE and one or more hardware limitations of the UE, configuring one or more secondary cells for the UE based, at least in part, on the CA capabilities reported by the UE in the enhanced CA report, receiving, at the base station, an indication from a second access network, wherein the indication indicates service initiation between the second access network and the UE, detecting triggering of the one or more hardware limitations based on the indication of service between the second access network and the UE, and deactivating the one or more secondary cells in response to detected triggering.

Additional aspects of the present disclosure are directed to a method for wireless communication including determining, at a UE, to reconfigure one or more of a plurality of RF resources of the UE, wherein one or more secondary cells are activated associated with the one or more plurality of RF resources, and transmitting one or more controlled value measurements to a base station, wherein the one or more controlled value measurements include pre-determined values selected by the UE that triggers the base station to modify the one or more secondary cells configured for the UE.

Additional aspects of the present disclosure are directed to a method for wireless communication including initiating communication between a UE and a first access network using one or more of a plurality of RF resources, detecting, at the UE, a measurement of one or more secondary cells associated with CA in a second access network, wherein the measurement would trigger activation of the one or more secondary cells by the second access network, and deactivating reporting of the measurement to the second access network.

Various aspects and features of the disclosure are described in further detail below.

BRIEF DESCRIPTION OF THE DRAWINGS

FIGS. 10-13 are a functional block diagrams illustrating example blocks executed to implement various aspects of the present disclosure.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
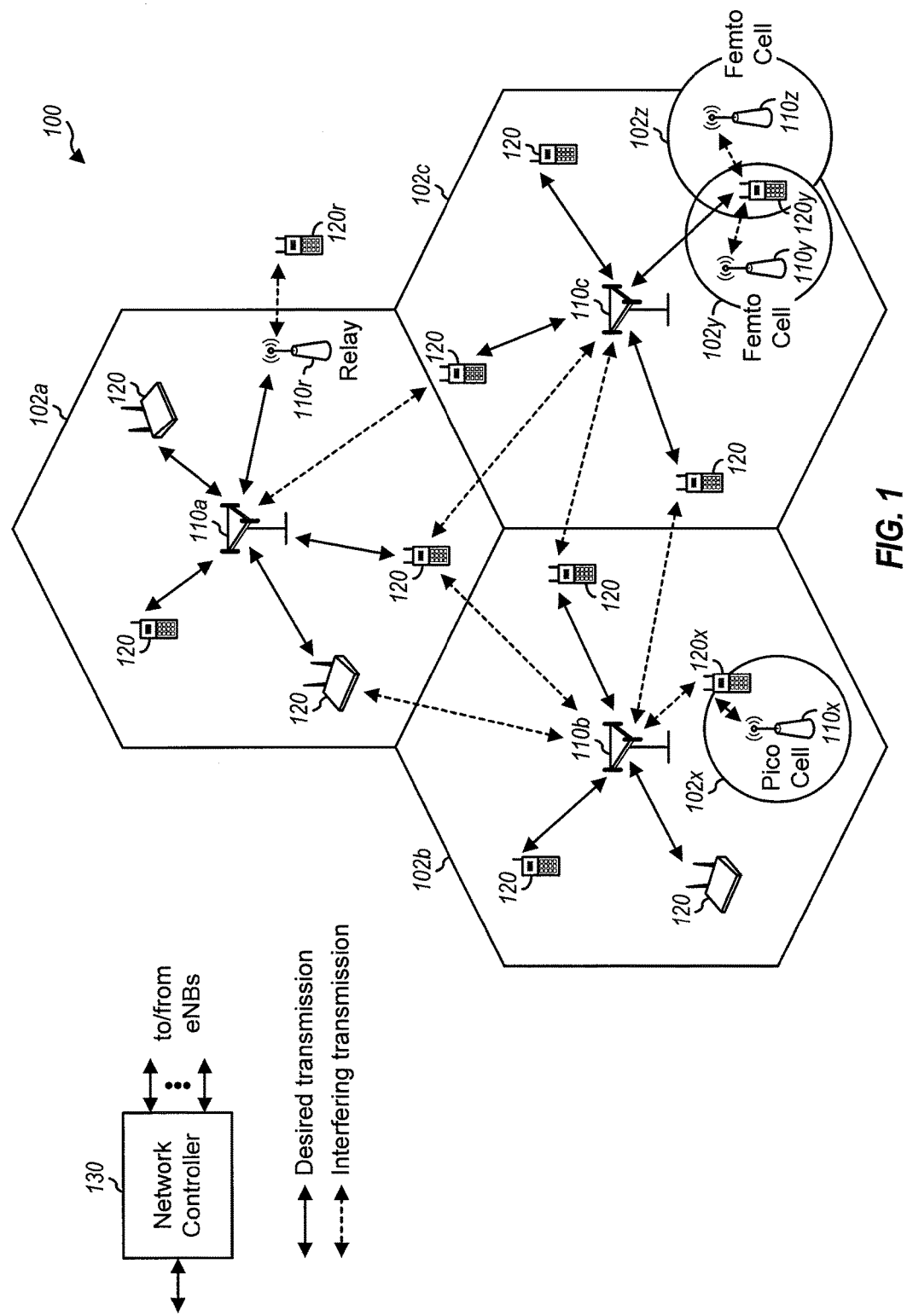
FIG. 1 is a block diagram conceptually illustrating an example of a telecommunications system.

FIG. 1 shows a wireless communication network 100, which may be an LTE network. The wireless network 100 may include a number of evolved Node Bs (eNodeBs) 110 and other network entities. An eNodeB may be a station that communicates with the UEs and may also be referred to as a base station, an access point, etc. A Node B is another example of a station that communicates with the UEs.

Each eNodeB 110 may provide communication coverage for a particular geographic area. In 3GPP, the term "cell" can refer to a coverage area of an eNodeB and/or an eNodeB subsystem serving this coverage area, depending on the context in which the term is used.

An eNodeB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). An eNodeB for a macro cell may be referred to as a macro eNodeB. An eNodeB for a pico cell may be referred to as a pico eNodeB. An eNodeB for a femto cell may be referred to as a femto eNodeB or a home eNodeB. In the example shown in FIG. 1, the eNodeBs 110a, 110b and 110c may be macro eNodeBs for the macro cells 102a, 102b and 102c, respectively. The eNodeB 110x may be a pico eNodeB for a pico cell 102x. The eNodeBs 110y and 110z may be femto eNodeBs for the femto cells 102y and 102z, respectively. An eNodeB may support one or multiple (e.g., three) cells.

The wireless network 100 may also include relay stations. A relay station is a station that receives a transmission of data and/or other information from an upstream station (e.g., an eNodeB or a UE) and sends a transmission of the data and/or other information to a downstream station (e.g., a UE or an eNodeB). A relay station may also be a UE that relays transmissions for other UEs. In the example shown in FIG. 1, a relay station 110r may communicate with the eNodeB 110a and a UE 120r in order to facilitate communication between the eNodeB 110a and the UE 120r. A relay station may also be referred to as a relay eNodeB, a relay, etc.

The wireless network 100 may be a heterogeneous network that includes eNodeBs of different types, e.g., macro eNodeBs, pico eNodeBs, femto eNodeBs, relays, etc. These different types of eNodeBs may have different transmit power levels, different coverage areas, and different impact on interference in the wireless network 100. For example, macro eNodeBs may have a high transmit power level (e.g., 20 Watts) whereas pico eNodeBs, femto eNodeBs and relays may have a lower transmit power level (e.g., 1 Watt).

The wireless network 100 may support synchronous or asynchronous operation. For synchronous operation, the eNodeBs may have similar frame timing, and transmissions from different eNodeBs may be approximately aligned in time. For asynchronous operation, the eNodeBs may have different frame timing, and transmissions from different eNodeBs may not be aligned in time. The techniques described herein may be used for both synchronous and asynchronous operation.

A network controller 130 may couple to a set of eNodeBs and provide coordination and control for these eNodeBs. The network controller 130 may communicate with the eNodeBs 110 via a backhaul. The eNodeBs 110 may also communicate with one another, e.g., directly or indirectly via wireless or wireline backhaul.

The UEs 120 may be dispersed throughout the wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, etc. A UE may be able to communicate with macro eNodeBs, pico eNodeBs, femto eNodeBs, relays, etc. In FIG. 1, a solid line with double arrows indicates desired transmissions between a UE and a serving eNodeB, which is an eNodeB designated to serve the UE on the downlink and/or uplink. A dashed line with double arrows indicates interfering transmissions between a UE and an eNodeB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

Figure 2:
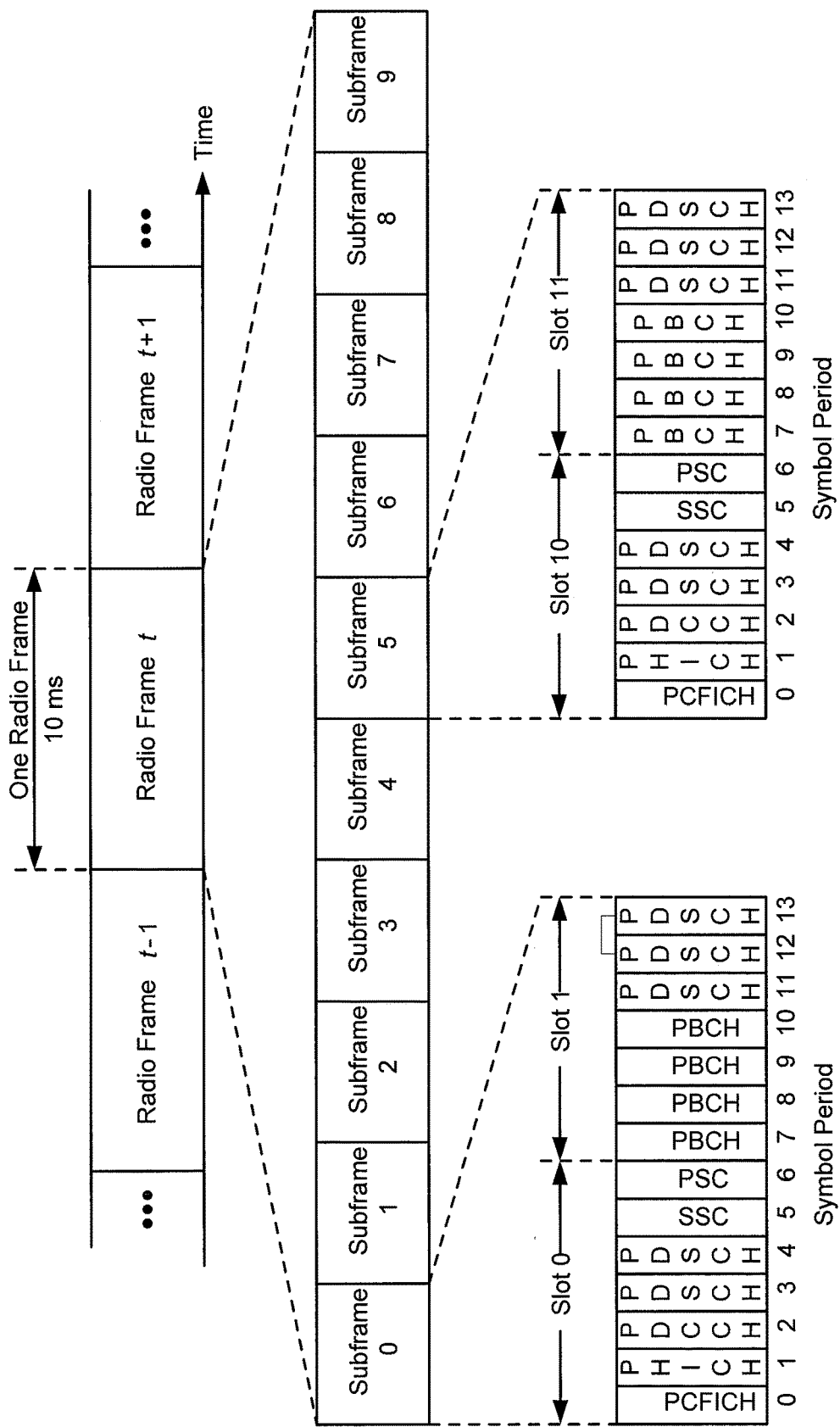
FIG. 2 is a block diagram conceptually illustrating an example of a down link frame structure in a telecommunications system.

FIG. 2 shows a down link frame structure used in LTE. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 2) or 14 symbol periods for an extended cyclic prefix. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE, an eNodeB may send a primary synchronization signal (PSS) and a secondary synchronization signal (SSS) for each cell in the eNodeB. The primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. The eNodeB may send a Physical Broadcast Channel (PBCH) in symbol periods 0 to 3 in slot 1 of subframe 0. The PBCH may carry certain system information.

The eNodeB may send a Physical Control Format Indicator Channel (PCFICH) in only a portion of the first symbol period of each subframe, although depicted in the entire first symbol period in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNodeB may send a Physical HARQ Indicator Channel (PHICH) and a Physical Downlink Control Channel (PDCCH) in the first M symbol periods of each subframe (M=3 in FIG. 2). The PHICH may carry information to support hybrid automatic retransmission (HARQ). The PDCCH may carry information on uplink and downlink resource allocation for UEs and power control information for uplink channels. Although not shown in the first symbol period in FIG. 2, it is understood that the PDCCH and PHICH are also included in the first symbol period. Similarly, the PHICH and PDCCH are also both in the second and third symbol periods, although not .shown that way in FIG. 2. The eNodeB may send a Physical Downlink Shared Channel (PDSCH) in the remaining symbol periods of each subframe. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNodeB may send the PSS, SSS and PBCH in the center 1.08 MHz of the system bandwidth used by the eNodeB. The eNodeB may send the PCFICH and PHICH across the entire system bandwidth in each symbol period in which these channels are sent. The eNodeB may send the PDCCH to groups of UEs in certain portions of the system bandwidth. The eNodeB may send the PDSCH to specific UEs in specific portions of the system bandwidth. The eNodeB may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNodeB may send the PDCCH to the UE in any of the combinations that the UE will search.

A UE may be within the coverage of multiple eNodeBs. One of these eNodeBs may be selected to serve the UE. The serving eNodeB may be selected based on various criteria such as received power, path loss, signal-to-noise ratio (SNR), etc.

Figure 3:
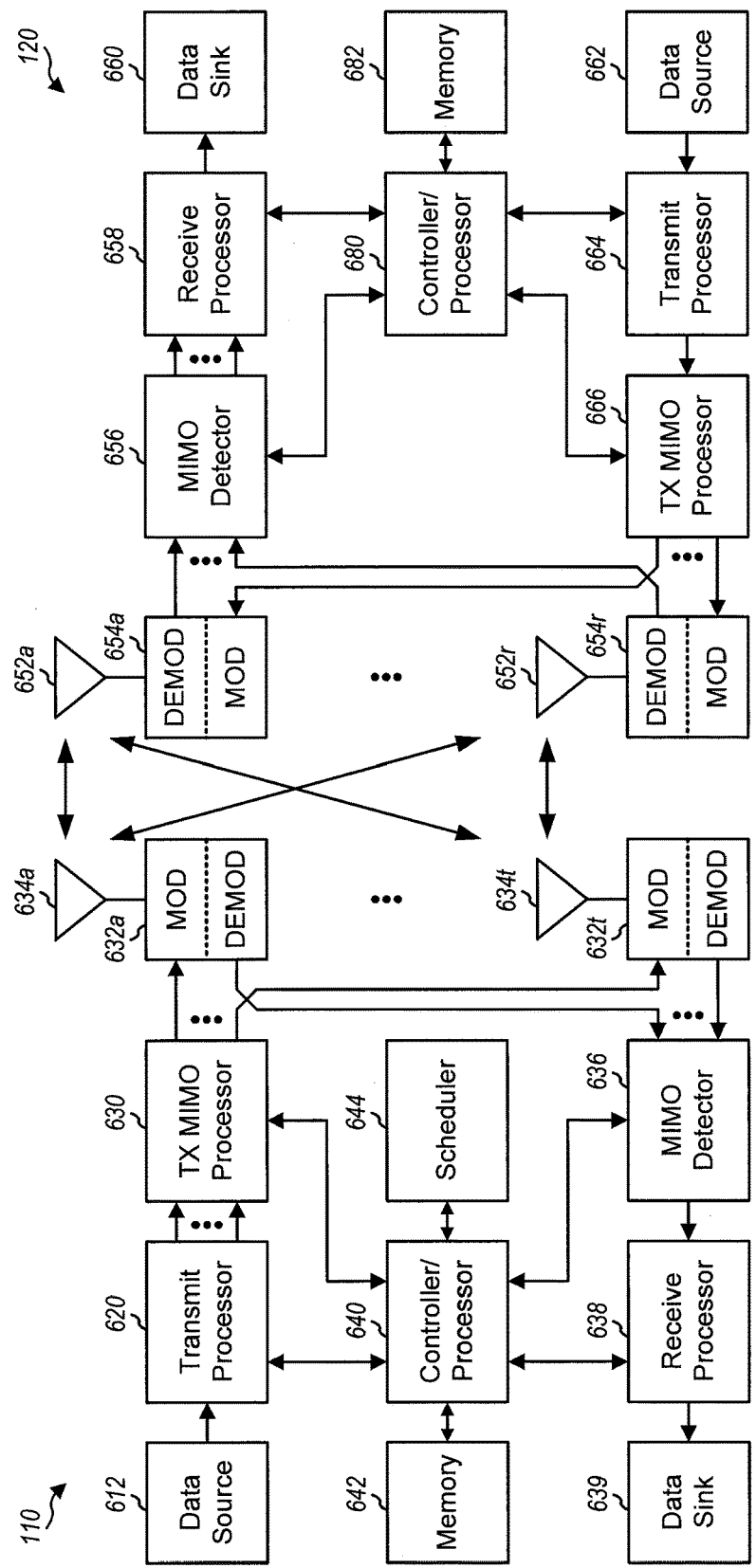
FIG. 3 is a block diagram conceptually illustrating a design of an eNodeB and a UE configured according to one aspect of the present disclosure.

FIG. 3 shows a block diagram of a design of an eNodeB 110 and a UE 120, which may be one of the eNodeBs and one of the UEs in FIG. 1. For a restricted association scenario, the eNodeB 110 may be the macro eNodeB 110c in FIG. 1, and the UE 120 may be the UE 120y. The eNodeB 110 may be equipped with antennas 634a through 634t, and the UE 120 may be equipped with antennas 652a through 652r.

At the eNodeB 110, a transmit processor 620 may receive data from a data source 612 and control information from a controller/processor 640. The control information may be for the PBCH, PCFICH, PHICH, PDCCH, etc. The data may be for the PDSCH, etc. The processor 620 may process (e.g., encode and symbol map) the data and control information to obtain data symbols and control symbols, respectively. The processor 620 may also generate reference symbols, e.g., for the PSS, SSS, and cell-specific reference signal. A transmit (TX) multiple-input multiple-output (MIMO) processor 630 may perform spatial processing (e.g., precoding) on the data symbols, the control symbols, and/or the reference symbols, if applicable, and may provide output symbol streams to the modulators (MODs) 632a through 632t. Each modulator 632 may process a respective output symbol stream (e.g., for OFDM, etc.) to obtain an output sample stream. Each modulator 632 may further process (e.g., convert to analog, amplify, filter, and upconvert) the output sample stream to obtain a downlink signal. Downlink signals from modulators 632a through 632t may be transmitted via the antennas 634a through 634t, respectively.

At the UE 120, the antennas 652a through 652r may receive the downlink signals from the eNodeB 110 and may provide received signals to the demodulators (DEMODs) 654a through 654r, respectively. Each demodulator 654 may condition (e.g., filter, amplify, downconvert, and digitize) a respective received signal to obtain input samples. Each demodulator 654 may further process the input samples (e.g., for OFDM, etc.) to obtain received symbols. A MIMO detector 656 may obtain received symbols from all the demodulators 654a through 654r, perform MIMO detection on the received symbols if applicable, and provide detected symbols. A receive processor 658 may process (e.g., demodulate, deinterleave, and decode) the detected symbols, provide decoded data for the UE 120 to a data sink 660, and provide decoded control information to a controller/processor 680.

On the uplink, at the UE 120, a transmit processor 664 may receive and process data (e.g., for the PUSCH) from a data source 662 and control information (e.g., for the PUCCH) from the controller/processor 680. The transmit processor 664 may also generate reference symbols for a reference signal. The symbols from the transmit processor 664 may be precoded by a TX MIMO processor 666 if applicable, further processed by the demodulators 654a through 654r (e.g., for SC-FDM, etc.), and transmitted to the eNodeB 110. At the eNodeB 110, the uplink signals from the UE 120 may be received by the antennas 634, processed by the modulators 632, detected by a MIMO detector 636 if applicable, and further processed by a receive processor 638 to obtain decoded data and control information sent by the UE 120. The receive processor 638 may provide the decoded data to a data sink 639 and the decoded control information to the controller/processor 640.

The controllers/processors 640 and 680 may direct the operation at the eNodeB 110 and the UE 120, respectively. The processor 640 and/or other processors and modules at the eNodeB 110 may perform or direct the execution of various processes for the techniques described herein. The memories 642 and 682 may store data and program codes for the eNodeB 110 and the UE 120, respectively. A scheduler 644 may schedule UEs for data transmission on the downlink and/or uplink.

Carrier Aggregation

LTE-Advanced UEs use spectrum up to 20 MHz bandwidths allocated in a carrier aggregation of up to a total of 100 MHz (5 component carriers) used for transmission in each direction. Generally, less traffic is transmitted on the uplink than the downlink, so the uplink spectrum allocation may be smaller than the downlink allocation. For example, if 20 MHz is assigned to the uplink, the downlink may be assigned 100 MHz. These asymmetric FDD assignments will conserve spectrum and are a good fit for the typically asymmetric bandwidth utilization by broadband subscribers.

Carrier Aggregation Types

Figure 4A:
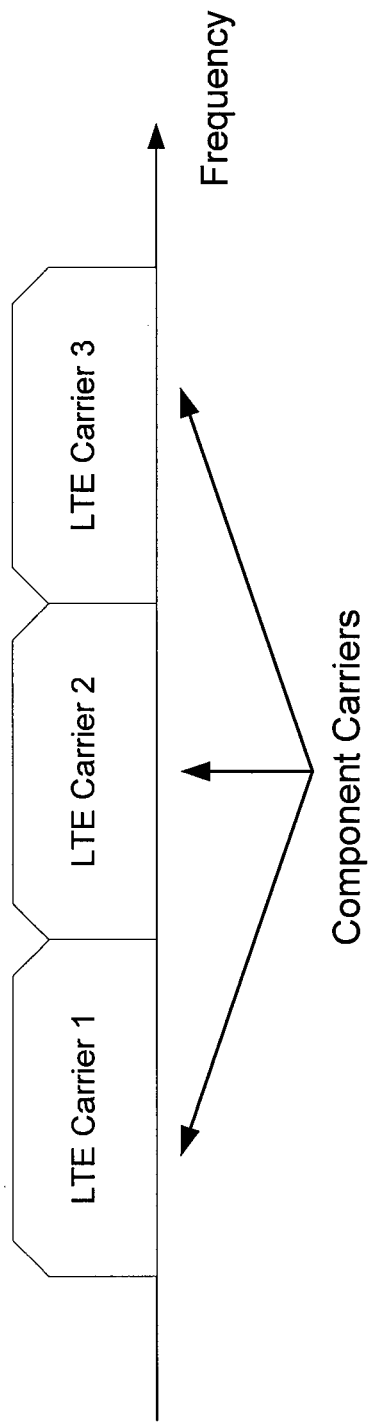
FIG. 4A discloses a continuous carrier aggregation type.
Figure 4B:
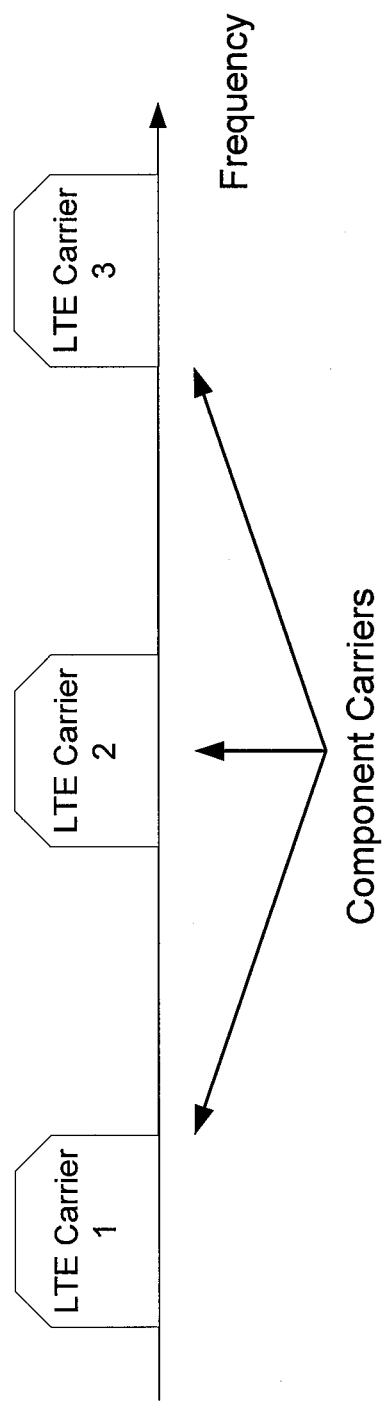
FIG. 4B discloses a non-continuous carrier aggregation type.

For the LTE-Advanced mobile systems, two types of carrier aggregation (CA) methods have been proposed, continuous CA and non-continuous CA. They are illustrated in FIGS. 4A and 4B. Non-continuous CA occurs when multiple available component carriers are separated along the frequency band (FIG. 4B). On the other hand, continuous CA occurs when multiple available component carriers are adjacent to each other (FIG. 4A). Both non-continuous and continuous CA aggregate multiple LTE/component carriers to serve a single unit of LTE Advanced UE.

Multiple RF receiving units and multiple FFTs may be deployed with non-continuous CA in LTE-Advanced UE since the carriers are separated along the frequency band. Because non-continuous CA supports data transmissions over multiple separated carriers across a large frequency range, propagation path loss, Doppler shift and other radio channel characteristics may vary a lot at different frequency bands.

Thus, to support broadband data transmission under the non-continuous CA approach, methods may be used to adaptively adjust coding, modulation and transmission power for different component carriers. For example, in an LTE-Advanced system where the enhanced NodeB (eNodeB) has fixed transmitting power on each component carrier, the effective coverage or supportable modulation and coding of each component carrier may be different.

Data Aggregation Schemes

Figure 5:
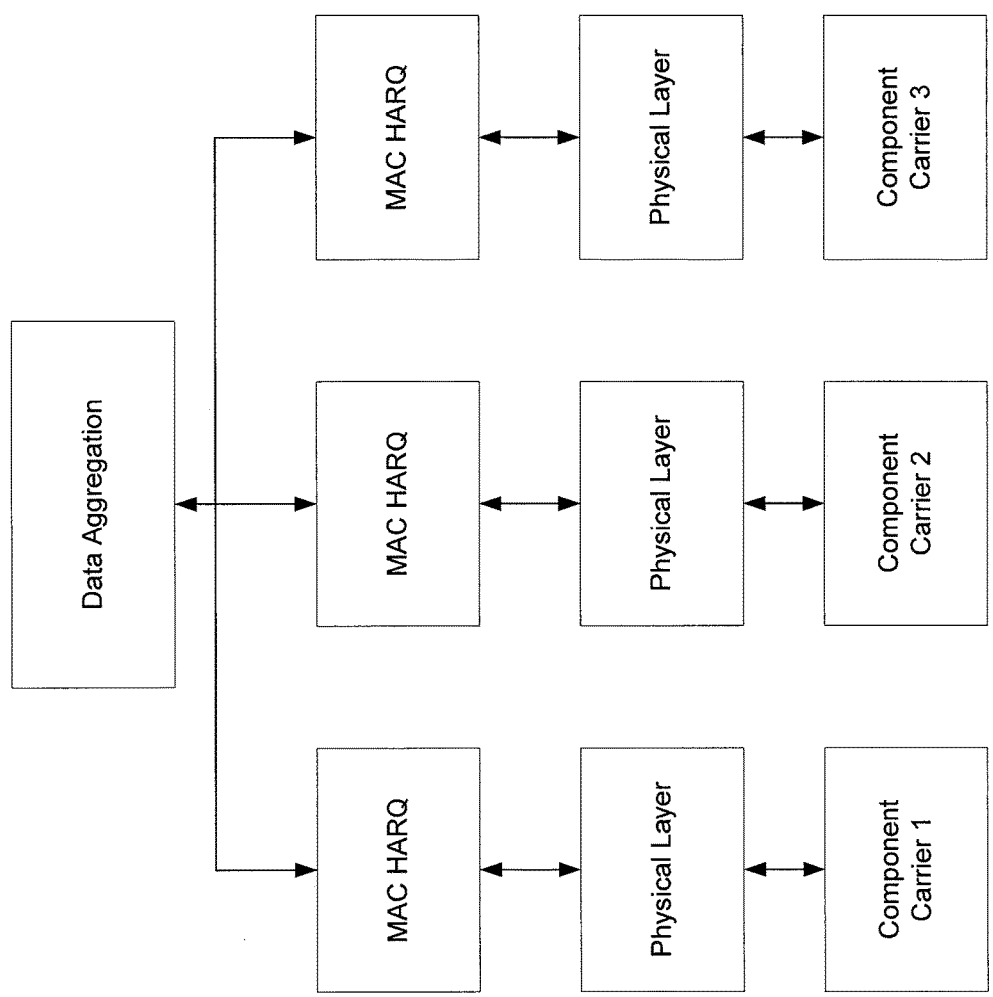
FIG. 5 discloses MAC layer data aggregation.

FIG. 5 illustrates aggregating transmission blocks (TBs) from different component carriers at the medium access control (MAC) layer (FIG. 5) for an IMT-Advanced system. With MAC layer data aggregation, each component carrier has its own independent hybrid automatic repeat request (HARQ) entity in the MAC layer and its own transmission configuration parameters (e.g., transmitting power, modulation and coding schemes, and multiple antenna configuration) in the physical layer. Similarly, in the physical layer, one HARQ entity is provided for each component carrier.

Control Signaling

In general, there are three different approaches for deploying control channel signaling for multiple component carriers. The first involves a minor modification of the control structure in LTE systems where each component carrier is given its own coded control channel.

The second method involves jointly coding the control channels of different component carriers and deploying the control channels in a dedicated component carrier. The control information for the multiple component carriers will be integrated as the signaling content in this dedicated control channel. As a result, backward compatibility with the control channel structure in LTE systems is maintained, while signaling overhead in the CA is reduced.

Multiple control channels for different component carriers are jointly coded and then transmitted over the entire frequency band formed by a third CA method. This approach offers low signaling overhead and high decoding performance in control channels, at the expense of high power consumption at the UE side. However, this method is not compatible with LTE systems.

Handover Control

It is preferable to support transmission continuity during the handover procedure across multiple cells when CA is used for IMT-Advanced UE. However, reserving sufficient system resources (i.e., component carriers with good transmission quality) for the incoming UE with specific CA configurations and quality of service (QoS) requirements may be challenging for the next eNodeB. The reason is that the channel conditions of two (or more) adjacent cells (eNodeBs) may be different for the specific UE. In one approach, the UE measures the performance of only one component carrier in each adjacent cell. This offers similar measurement delay, complexity, and energy consumption as that in LTE systems. An estimate of the performance of the other component carriers in the corresponding cell may be based on the measurement result of the one component carrier. Based on this estimate, the handover decision and transmission configuration may be determined.

According to various embodiments, the UE operating in a multicarrier system (also referred to as carrier aggregation) is configured to aggregate certain functions of multiple carriers, such as control and feedback functions, on the same carrier, which may be referred to as a "primary carrier." The remaining carriers that depend on the primary carrier for support are referred to as associated secondary carriers. For example, the UE may aggregate control functions such as those provided by the optional dedicated channel (DCH), the nonscheduled grants, a physical uplink control channel (PUCCH), and/or a physical downlink control channel (PDCCH). Signaling and payload may be transmitted both on the downlink by the eNode B to the UE, and on the uplink by the UE to the eNode B.

In some embodiments, there may be multiple primary carriers. In addition, secondary carriers may be added or removed without affecting the basic operation of the UE, including physical channel establishment and RLF procedures which are layer 2 procedures, such as in the 3GPP technical specification 36.331 for the LTE RRC protocol.

Figure 6:
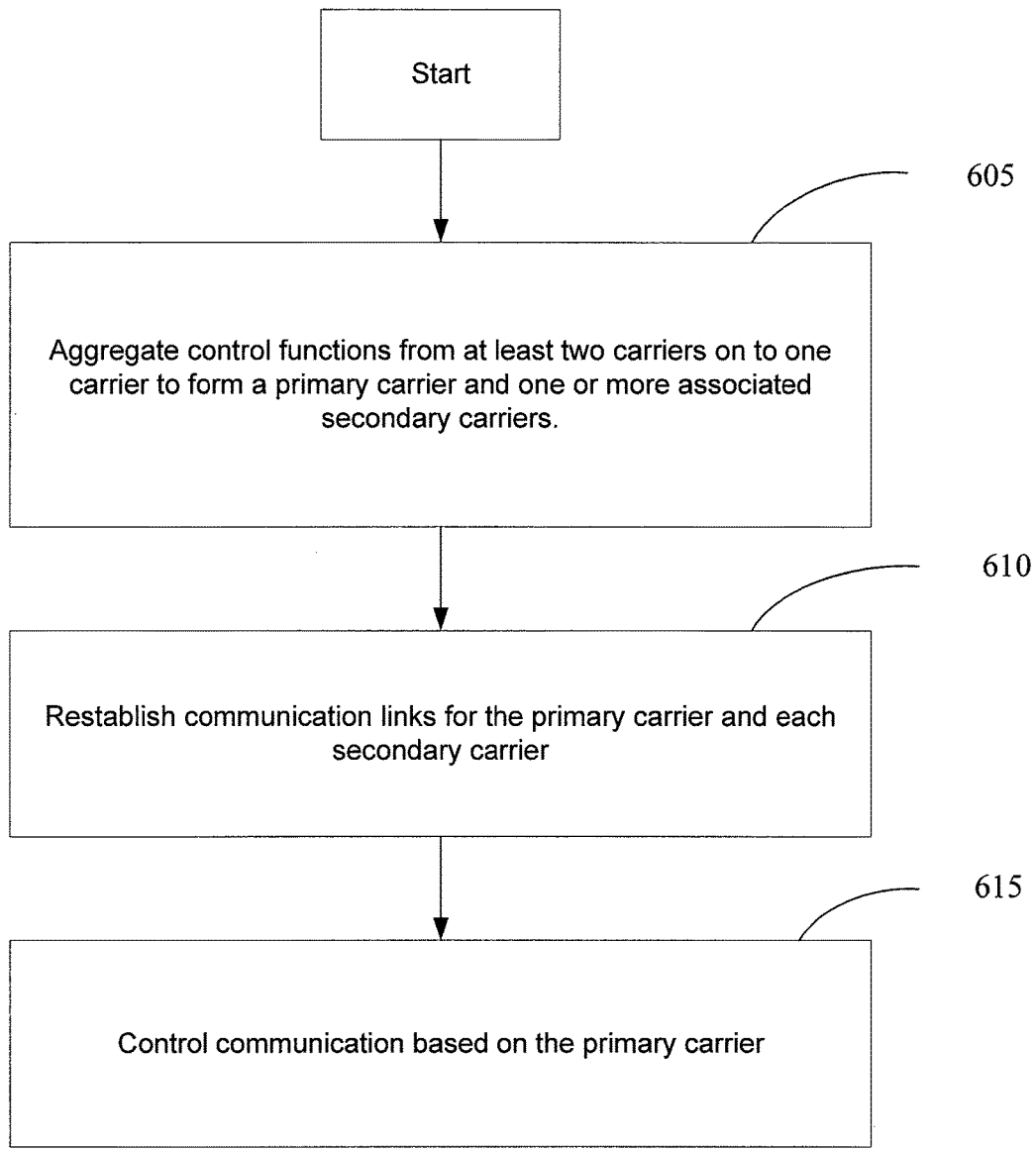
FIG. 6 is a block diagram illustrating a method for controlling radio links in multiple carrier configurations.

FIG. 6 illustrates a method 600 for controlling radio links in a multiple carrier wireless communication system by grouping physical channels according to one example. As shown, the method includes, at block 605, aggregating control functions from at least two carriers onto one carrier to form a primary carrier and one or more associated secondary carriers. Next at block, 610, communication links are established for the primary carrier and each secondary carrier. Then, communication is controlled based on the primary carrier in block 615.

It is contemplated that future advanced wireless networks that use CA will support simultaneous voice and LTE (SVLTE). This requirement implies the following: (1) a UE shall support receiving 1X pages while in LTE radio resource control (RRC) connected mode; and (2) a UE shall support mobile initiated and mobile terminated voice calls on 1X while in LTE RRC connected mode. Due to hardware limitations, having two carriers (assuming MIMO operation is required on both carriers) is not available while the UE is on 1X. The UE would not be able to monitor the second carrier while it is on 1X. For example, when checking 1X pages, the UE will tune away from the LTE network in order to listen for pages on the 1X network and then return to the LTE network.

Rel. 10 does not provide means for the UE to communicate with an eNodeB regarding the change in UE capability for supporting CA. Also, there is currently no "standard" method for the UE to notify the eNodeB that it is dropping/deactivating the second cell. Thus, several problems arise in addressing this specific use-case. First, a mechanism would need to be provided for a UE with two carriers activated to be able to receive a page on 1X. Second, a mechanism would need to be provided for a UE with two carriers activated to either drop a carrier or disable MIMO operation so that a receive chain can be allocated to 1X. Third, a mechanism would need to be provided for a UE that has specified capability for carrier aggregation and is currently on 1X to prevent the network from activating a secondary cell. Fourth, a mechanism would need to be provided for a UE to re-activate the secondary carrier (if it was de-activated) after the 1X call.

The CA capabilities of a UE are negotiated during a UE capability transfer that occurs during initial attachment. Secondary cell(s) are configured by RRC, which may occur every time the UE establishes a RRC connection, that is, it moves from LTE IDLE to CONNECTED state, or while the UE is in RRC CONNECTED state. However, secondary carrier(s) remain de-activated until a MAC activation control element is received and activates the carrier(s). If the MAC activation control element is received at time n, then the UE will decode PDCCH and PDSCH on the secondary cell starting at time n+8. However, the problem is that after a UE advertises support for CA and the band combination, and, when the secondary carrier(s) are activated, there is currently no standards-compliant way for the UE to drop/deactivate one of the carriers.

The various aspects of the present disclosure may be divided into two categories: (1) a standards-based approach—proposing changes in the standard (Rel. 10 or 11) that would enable the UE to address the above use-cases; and (2) a non-standards-based approach—what can the UE do to minimize the impact on the user experience when dropping the second carrier.

In a standards-based approach, one aspect provides for a UE to signal the base station when the UE desires to re-provision one or more of its RF processing chains. For example, a UE with CA capability with multiple active cells may desire to switch to another network, such as a 1X network, to receive a voice call. In such circumstances, the UE may signal the base station to deactivate one or more of the secondary cells in order to allocate the RF processing chain to the 1X network.

Figure 7:
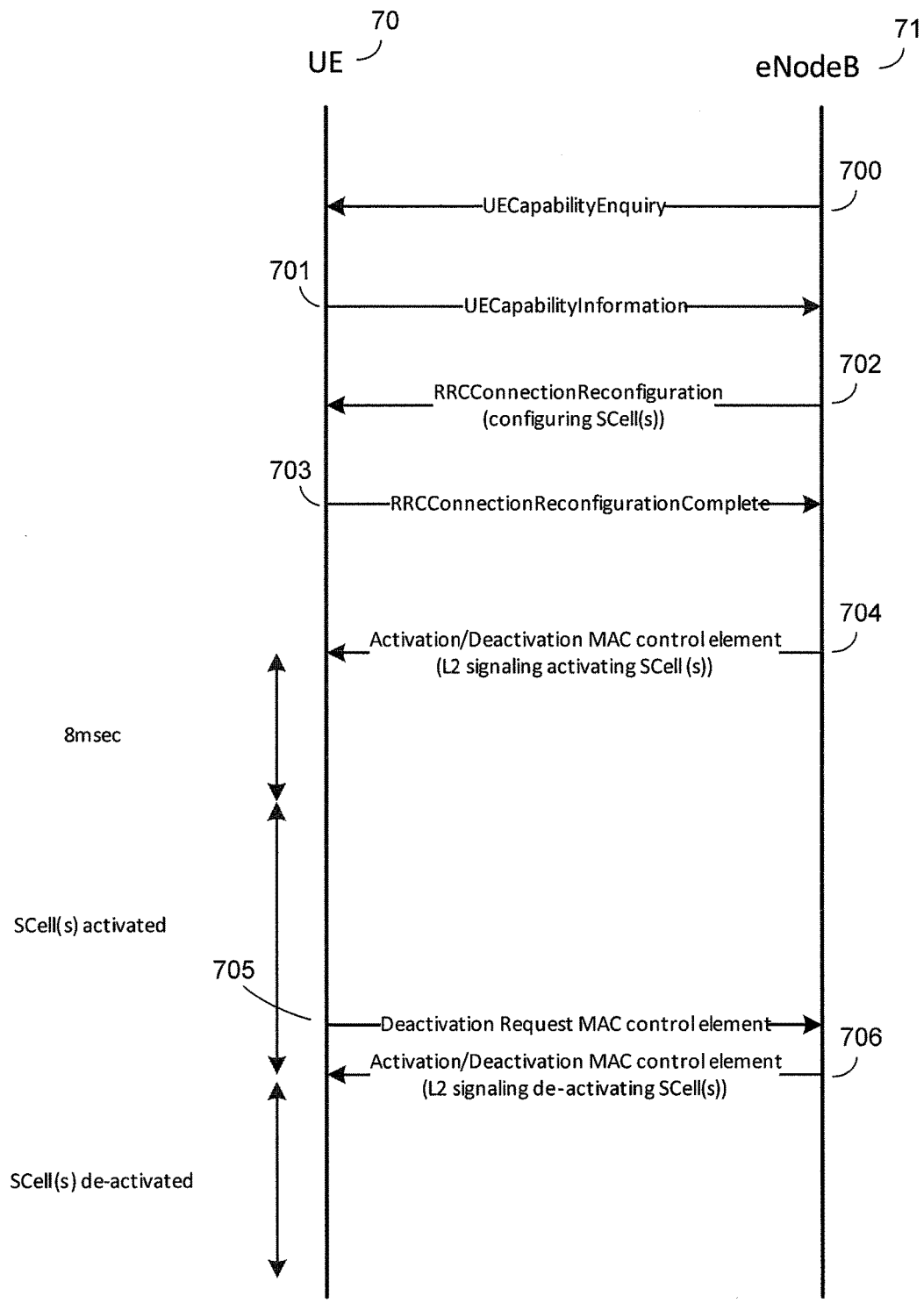
FIG. 7 is a call flow diagram illustrating a UE configured according to one aspect of the present disclosure.

FIG. 7 is a call flow diagram illustrating a UE 70 configured according to one aspect of the present disclosure. At point 700, an eNodeB 71 transmits a UE capability enquiry to the UE 70. At point 701, the UE 70 sends its CA capability information to the eNodeB 71. Based on this CA capability information, the eNodeB 71 sends an RRC connection reconfiguration to the UE 70, at 702, that signals the UE 70 to configure the secondary cells that will be assigned to the UE 70. The UE 70, at point 703, then sends an RRC reconfiguration complete message to eNodeB 71. The UE 70 will monitor and send measurement events to eNodeB 71 until any one or more of the secondary cells becomes suitable for activation. The eNodeB 71, at point 704, activates the one or more of the secondary cells.

At point 705, the UE 70 determines that it desires to re-provision one or more of its RF processing chains and sends a deactivation request to the eNodeB 71. For example, the UE 70 may desire to switch to another network, such as a 1X network to monitor for pages or make/receive a call. The UE 70 may also desire to re-allocate the bandwidth that has been assigned to it or otherwise change the capabilities information that it provided to eNodeB 71 at point 701. In response to receiving the deactivation request, the eNodeB 71 transmits deactivation signals, at point 706, to the UE 70.

One aspect for implementing this UE-initiated approach would be to add a new MAC control element for the UE to request the eNodeB to de-activate/re-activate one or more of the configured and possibly activated secondary cells. Support of this will be optional for an eNodeB. The UE may use this new MAC control element to communicate with the eNodeB that one of the carriers should be de-activated. De-activation of the carrier is still under the eNodeB's control and the carrier will, therefore, be de-activated by sending the de-activation MAC control IE.

The new "Activation/Deactivation request" MAC control element is specified by logical channel identifier (LCID), shown in Table 1 below. The Activation/Deactivation request MAC control element may have a fixed size and consist of a single octet containing seven C-fields and one R-field. The Activation/Deactivation request MAC control element is defined as follows:

$C_i$: if there is a secondary cell activated with SCellIndex i, and the corresponding bit is set to zero, this field indicates the UE is requesting deactivation of the SCell with SCellIndex i. Otherwise, if the configured secondary cell is deactivated and the corresponding field is set to one, then UE is requesting activation of the SCell.

TABLE 1

Values of LCID for UL-SCH

| Index | LCID values |
|---|---|
| 00000 | CCCH |
| 00001-01010 | Identity of the logical channel |
| 01011 | Activation/Deactivation request |
| 01100-11000 | Reserved |
| 11001 | Extended Power Headroom Report |
| 11010 | Power Headroom Report |
| 11011 | C-RNTI |
| 11100 | Truncated BSR |
| 11101 | Short BSR |
| 11110 | Long BSR |
| 11111 | Padding |

Figure 8:
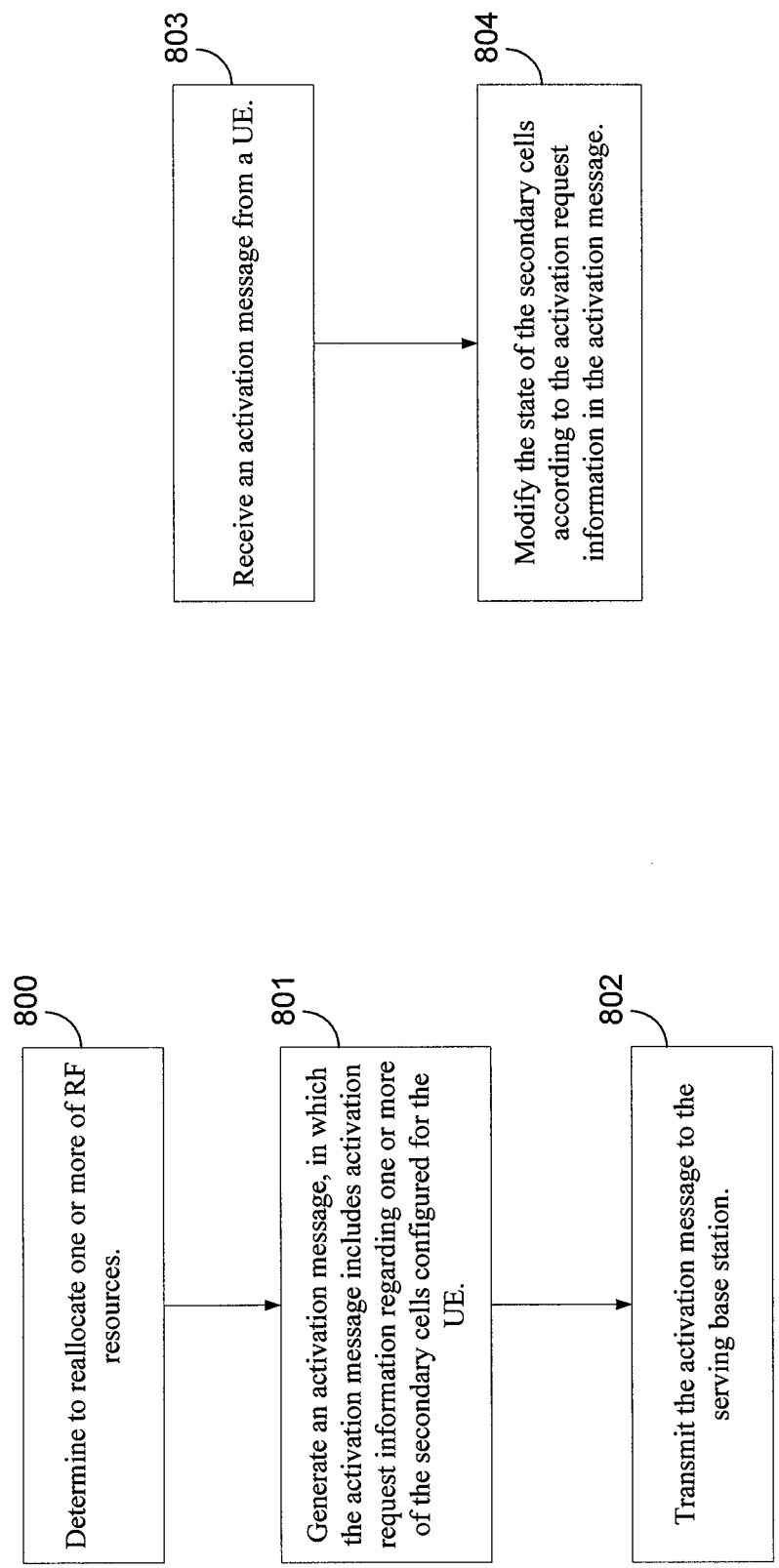
FIGS. 8A-8B are a functional block diagrams illustrating example blocks executed to implement various aspects of the present disclosure.

FIG. 8A is a functional block diagram illustrating example blocks executed to implement one aspect of the present disclosure. At block 800, a UE determines to re-provision one or more of RF processing chains. This may happen because the UE wants to access another network, re-allocate bandwidth, or otherwise update its CA capabilities with the base station. At block 801, the UE generates an activation message, in which the activation message includes activation request information regarding one or more of the secondary cells configured for the UE. The activation request information may request the base station to activate or de-activate the one or more secondary cells. The UE then transmits the activation message to the serving base station, at block 802.

FIG. 8B is a functional block diagram illustrating example blocks executed to implement one aspect of the present disclosure from the perspective of the base station. At block 803, the base station receives the activation message from the UE. The base station then modifies the state of the secondary cells, in block 804, according to the activation request information in the activation message. Thus, the base station may either activate or de-activate the secondary cells depending on which action was requested by the UE.

In an additional standards based approach, one aspect of the present disclosure provides for the network to de-activate/re-activate one or more of the activated secondary cells based on knowledge in the network. In one aspect to implement this solution, the UE provides additional information in its UE Capability Information message to the base station. For example, the UE may declare its hardware limitations, including the total number of carriers it can support among different access technologies and/or the fact that some hardware associated with operating on certain carrier(s) is shared among different access technologies.

By having access to this hardware limitation information, the network may trigger de-activation of one or more carriers based on the knowledge that: (1) a service in the other access network that requires operation with the shared hardware has been activated; or (2) a data flow in the network is transferred to the other access network. The network may also trigger (re-)activation of one or more carriers based on the knowledge that: (1) a service in the other access network that requires operation with the shared hardware has been deactivated; or (2) a data flow in the other network that requires operation with the shared hardware is transferred to the network.

Various aspects of the present disclosure implementing this network-controlled approach may use a network backhaul interaction between the network and the other networks, so that the network can obtain the above knowledge on the other access network.

Figure 9:
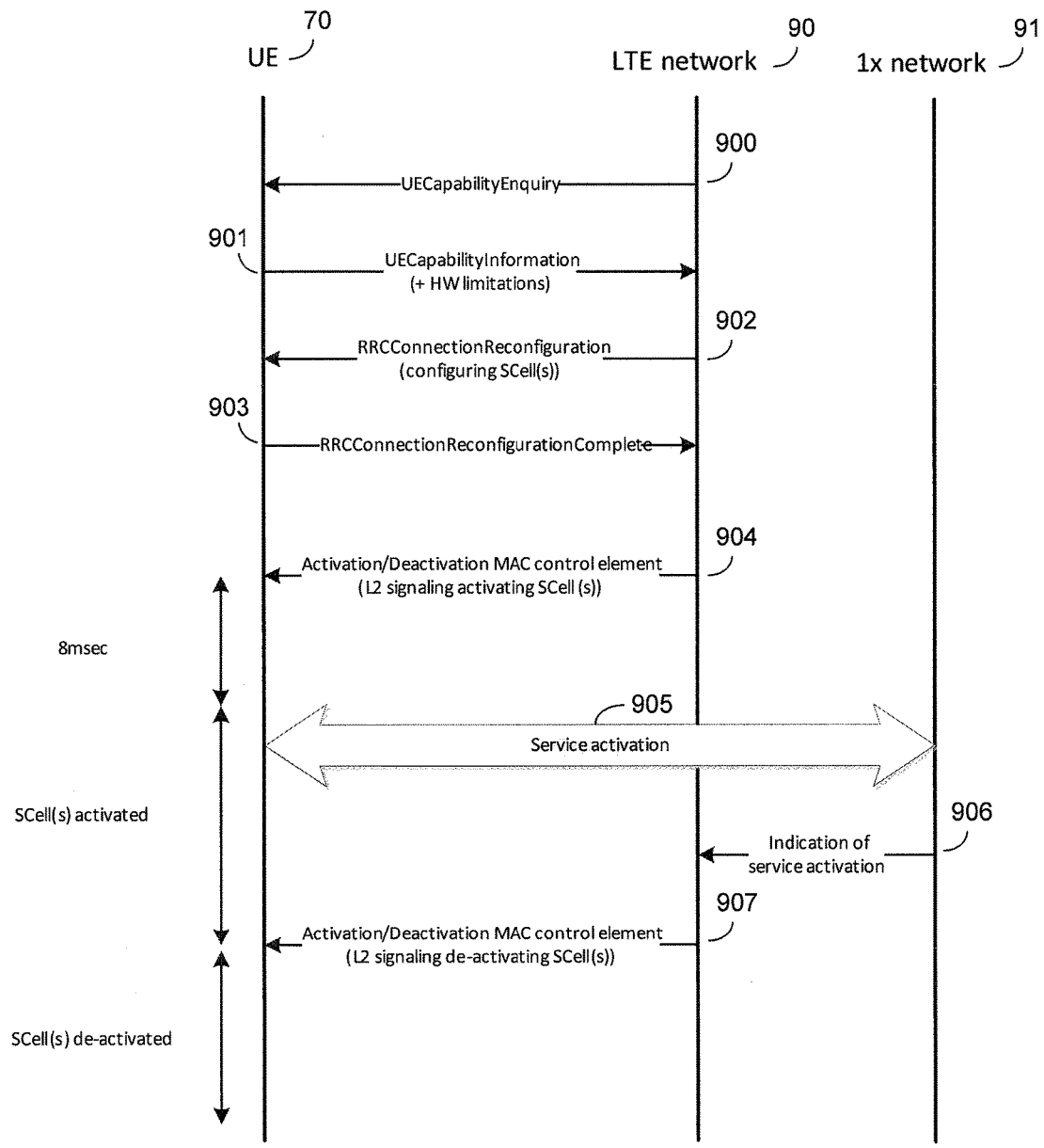
FIG. 9 is a call flow diagram illustrating an example call flow between a UE, an LTE network, and a 1X network 91, each configured according to one aspect of the present disclosure.

FIG. 9 is a call flow diagram illustrating an example call flow between a UE 70, an LTE network 90, and a 1X network 91, each configured according to one aspect of the present disclosure. At point 900, the LTE network 90 sends a UE capability inquiry to the UE 70. The UE 70 responds, at point 901, by sending an enhanced CA capability message. The enhanced CA capability message not only includes information on the CA capabilities of the UE 70, but also includes information regarding any hardware limitations for the UE 70. For example, this hardware limitation may include the total number of carriers it can support among different access technologies and/or the fact that some hardware associated with operating on certain carrier(s) is shared among different access technologies.

At point 902, the LTE network 90 sends the RRC connection reconfiguration message that configures the secondary cells. The UE 70, at point 903, sends an RRC connection reconfiguration complete message to the LTE network 90. The UE 70 begins lower layer configuration of the secondary cells after receiving the RRC connection reconfiguration message from the LTE network 90. When the LTE network 90 determines that the configured secondary cells have reached a quality to be activated, the LTE network 90 activates the secondary cells, at point 904.

At point 905, a service activation occurs between the UE 70 and the 1X network 91. The 1X network 91 also sends an indication to the LTE network 90, at point 906, that such a service between the 1X network 91 and UE 70 is active. Based on the hardware limitations that the UE 70 has sent to the LTE network 90, LTE network 90 knows that the UE 70 cannot simultaneously maintain the secondary cell and with the service with 1X network 91. Therefore, at point 907, the LTE network 90 deactivates the secondary cells.

FIG. 10 is a functional block diagram illustrating example blocks executed to implement one aspect of the present disclosure. In block 1000, a UE generates an enhanced CA capabilities report, wherein the enhanced CA capabilities report includes CA capabilities of the UE and hardware limitations of the UE. The UE then transmits the enhanced CA capabilities report, in block 1001, to a serving base station.

FIG. 11 is a functional block diagram illustrating example blocks executed to implement one aspect of the present disclosure. In block 1100, a base station receives an enhanced CA capabilities report from a UE, wherein the enhanced CA capabilities report includes CA capabilities of the UE and one or more hardware limitations of the UE. The base station configures one or more secondary cells for the UE, in block 1101, based, at least in part, on the CA capabilities reported by the UE in the enhanced CA report. An indication is received, in block 1102, at a base station from a second access network, wherein the indication indicates service initiation between the second access network and the UE. The base station detects, in block 1103, triggering of the one or more hardware limitations based on the indication of service between the second access network and the UE. In block 1104, the base station deactivates the one or more secondary cells in response to detected triggering.

Management of secondary carriers by UEs may also be provided without modifications to the current standards. In this cases, the UE may either drop or deactivate MIMO on the secondary cell(s) without explicitly signaling this to the eNodeB. However, UE may be able to implicitly convey this information so that the loss of the second carrier(s) is performed more gracefully.

In general, when a UE determines that it desires to re-purpose one or more of its RF processing chains, and, thus, manage or drop its activated secondary cells, the UE begins to provide controlled measurement reports to the base station. For example, instead of accurately reporting the channel quality indicator (CQI), rank indicator (RI), precoding matrix indicator (PMI), and the like, the UE begins sending the base station controlled measurement reports with specific information directed to cause the base station to slowly reduce the secondary cell. This false or controlled information, as received by the base station, makes the base station believe that the quality of the secondary cell(s) either cannot support MIMO, in which case the base station deactivates MIMO capability on the secondary cell, or completely deactivates the secondary cell as not suitable for transmission.

Figures 12, 13:
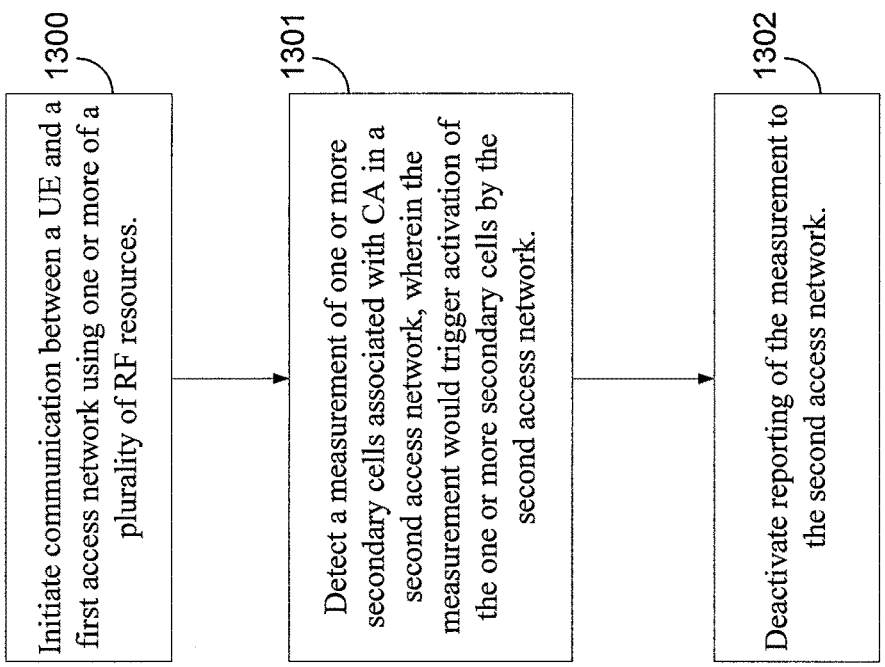

FIG. 12 is a functional block diagram illustrating example blocks executed to implement one aspect of the present disclosure. In block 1200, a UE determines to reconfigure one or more of a plurality of RF resources of the UE, wherein one or more secondary cells are activated associated with the one or more plurality of RF resources. In block 1201, the UE transmits one or more controlled value measurements to a base station, wherein the one or more controlled value measurements include pre-determined values selected by the UE that triggers the base station to modify the one or more secondary cells configured for the UE.

In one aspect of the present disclosure, the UE begins to ramp down CQI (or start reporting CQI=0). This, in addition to the UE refraining from ACK/NACK reporting for DL HARQs sent on DL should cause the eNodeB to stop scheduling on the affected carrier(s) and eventually de-activate them.

Ideally, the UE would start the CQI ramp down well in advance of its desire to re-purpose its RF processing chain, for example by making a 1X call or monitoring paging, so that the secondary cell becomes deactivated fast enough. The main challenge here is that the duration during which UE has to report low (or zero) before the network deactivates the secondary cell depends on the network's behavior. Therefore, the UE may have to ignore the secondary cell (e.g., not monitor its PDCCH) and move to the other access network reception before the secondary cell is explicitly deactivated by the eNodeB.

One solution that is proposed for monitoring 1X pages is to adopt page monitoring gaps similar to measurement gap but longer (~30 ms) and less frequent (paging cycle is typically ~2 s). This implementation, however, would need to be negotiated with the LTE network and carrier.

In another aspect of the present disclosure, instead of disabling the second cell(s) altogether, UE may be able to keep the carrier activated, but without necessity to maintain allocation of the second RF processing chain. This means that the UE will transition from "PCell-MIMO+SCell-MIMO" to "PCell-MIMO+SCell-MISO+1X." The UE will provide controlled reporting of the Rank Indicator (RI) in order to accomplish this transition. For example, the UE may begin only to report the RI at a rank of 1.

This approach has the advantage that the UE may still monitor PDCCH of the secondary cell and that the RI=1 reporting is fairly transparent to the UE and network. However, the secondary cell is usually configured for load balancing and/or peak data rate, in which case, the UE dropping down to rank 1 have a similar result as having no secondary cell at all.

It should be noted that the performance in both ramping down CQI to cause secondary cell drop and reporting a rank of 1 will depend on the eNodeB scheduler over multiple carriers.

In an additional aspect of the present disclosure, a more gradual approach may be provided, in which the UE goes from "PCell-MIMO+SCell-MIMO" to "PCell-MIMO+SCell-MISO+1x", and then to "PCell-MIMO+1x". Ideally, in this case, the UE's CQI ramp down reports will simulate a smoother channel degradation scenario and give the network enough time/understanding to deactivate the secondary cell without many HARQ failures. Furthermore, the gradual channel degradation would be harder to detect as an "out-of-standard" behavior.

It should be noted that, in yet additional aspects of the present disclosure, when a UE has reported CA capability, but the secondary cells have not yet been activated, it may find occasion where, during access to another network, or monitoring pages on another network, it may not want the current network to activate those secondary carriers. In typical operation, the UE is on 1X call, for example, and the UE has already negotiated CA capability. The UE should somehow prevent the secondary carrier(s) from being activated.

FIG. 13 is a functional block diagram illustrating example blocks executed to implement one aspect of the present disclosure. In block 1300, communication is initiated between a UE and a first access network using one or more of a plurality of RF resources. The UE detects, in block 1301, a measurement of one or more secondary cells associated with CA in a second access network, wherein the measurement would trigger activation of the one or more secondary cells by the second access network. In block 1302, the UE deactivates its reporting of the measurement to the second access network.

Activation of a particular secondary cell is expected to be based on the RRC event measurements, such as RRC event A1 and A4 reports by the UE. As long as the UE is able to prevent reporting of the measurements when the secondary cell has improved beyond a set threshold, the eNodeB is not expected to activate the secondary cell. This operation should not affect primary cell to primary cell handover scenario, however, in deployment scenarios where handover from primary cell to a secondary cell is needed, the above mechanism may have an impact.

In such a case of primary cell to secondary cell handover, the UE could selectively also start actually reporting secondary cell measurements in the case where the current primary cell is becoming weak, such that edge of cell performance is not negatively impacted. In case the secondary cell is added back again, the UE will again begin controlling its measurement reporting to manage or cause the drop of that secondary cell.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   determining at least one parameter associated with use of a component carrier by a user equipment (UE);
   adjusting the at least one parameter to affect an activation status of the component carrier, wherein adjusting the at least one parameter includes varying a reported rank indicator (RI) value from an actual RI value; and
   signaling the adjusted parameter to a base station, wherein the adjusting the at least one parameter is made in response to:
     identifying, at the UE, one selected from the group consisting of allocating one or more of a plurality of radio frequency (RF) processing chains from a first network to a second network, ending a call on the second network, and updating carrier aggregation capabilities of the UE with a serving base station; and
     determining, at the UE and in response to the identifying, to re-provision the one or more of the plurality of RF processing chains of the UE, wherein the determining to re-provision comprises determining to allocate the one or more of the plurality of RF processing chains to the component carrier, or determining to deallocate the one or more of the plurality of RF processing chains from the component carrier.

2. The method of claim 1, the at least one parameter further including a channel quality indicator (CQI) associated with the component carrier.

3. The method of claim 2, further including varying the reported CQI value from a measured CQI value in a series of steps.

4. The method of claim 1, wherein the identifying includes identifying at least one of: the allocating one or more of the plurality of RF processing chains from the first network to the second network, the ending the call on the second network, the updating the carrier aggregation capabilities of the UE with the serving base station, or determining to re-allocate bandwidth assigned to the UE.

5. The method of claim 1, further including generating an activation message, wherein the activation message is included in a media access control (MAC) control element.

6. An apparatus of wireless communication, comprising:
   means for determining at least one parameter associated with use of a component carrier by a user equipment (UE);
   means for adjusting the at least one parameter to affect an activation status of the component carrier, wherein the means for adjusting the at least one parameter includes means for varying a reported rank indicator (RI) value from an actual RI value; and means for signaling the adjusted parameter to a base station, wherein the means for adjusting the at least one parameter is made in response to:
  identifying, at the UE, one selected from the group consisting of allocating one or more of a plurality of radio frequency (RF) processing chains from a first network to a second network, ending a call on the second network, and updating carrier aggregation capabilities of the UE with a serving base station; and
  determining, at the UE and in response to the identifying, to re-provision the one or more of the plurality of RF processing chains of the UE, wherein the determining to re-provision comprises determining to allocate the one or more of the plurality of RF processing chains to the component carrier, or determining to deallocate the one or more of the plurality of RF processing chains from the component carrier.

7. The apparatus of claim 6, the at least one parameter further including a channel quality indicator (CQI) associated with the component carrier.

8. The apparatus of claim 7, further including varying the reported CQI value from a measured CQI value in a series of steps.

9. The apparatus of claim 6, wherein the identifying includes identifying at least one of: the allocating one or more of the plurality of RF processing from the first network to the second network, the ending the call on the second network, the updating the carrier aggregation capabilities of the UE with the serving base station, or
  determining to re-allocate bandwidth assigned to the UE.

10. The apparatus of claim 6, further comprising means for generating an activation message, wherein the activation message is included in a media access control (MAC) control element.

11. A computer program product for wireless communications in a wireless network, comprising:
  a non-transitory computer-readable medium having program code recorded thereon, the program code comprising program code to cause a computer to:
    determine at least one parameter associated with use of a component carrier by a user equipment (UE);
    adjust the at least one parameter to affect an activation status of the component carrier, wherein the program code to adjust the at least one parameter includes program code to vary a reported rank indicator (RI) value from an actual RI value; and
    signal the adjusted parameter to a base station, wherein the adjustment to the at least one parameter is made in response to:
      identifying, at the UE, one selected from the group consisting of allocating one or more of a plurality of radio frequency (RF) processing chains from a first network to a second network, ending a call on the second network, and updating carrier aggregation capabilities of the UE with a serving base station; and
      determining, at the UE and in response to the identifying, to re-provision the one or more of the plurality of RF processing chains of the UE, wherein the determining to re-provision comprises determining to allocate the one or more of the plurality of RF processing chains to the component carrier, or determining to deallocate the one or more of the plurality of RF processing chains from the component carrier.

12. The computer program product of claim 11, wherein the identifying includes identifying at least one of: the allocating one or more of the plurality of RF processing from the first network to the second network, the ending the call on the second network, the updating the carrier aggregation capabilities of the UE with the serving base station, or
  determining to re-allocate bandwidth assigned to the UE.

13. The computer program product of claim 11, further comprising program code to cause the computer to generate an activation message, wherein the activation message is included in a media access control (MAC) control element.

14. An apparatus configured for wireless communication, the apparatus comprising:
  at least one processor; and
  a memory coupled to said at least one processor,
  wherein the at least one processor is configured to:
    determine at least one parameter associated with use of a component carrier by a user equipment (UE);
    adjust the at least one parameter to affect an activation status of the component carrier, wherein the configuration of the at least one processor to adjust the at least one parameter includes configuration of the at least one processor to vary a reported rank indicator (RI) value from an actual RI value; and
    signal the adjusted parameter to a base station, wherein the adjustment to the at least one parameter is made in response to:
      identifying, at the UE, one selected from the group consisting of allocating one or more of a plurality of radio frequency (RF) processing chains from a first network to a second network, ending a call on the second network, and updating carrier aggregation capabilities of the UE with a serving base station; and
      determining, at the UE and in response to the identifying, to re-provision the one or more of the plurality of RF processing chains of the UE, wherein the determining to re-provision comprises determining to allocate the one or more of the plurality of RF processing chains to the component carrier, or determining to deallocate the one or more of the plurality of RF processing chains from the component carrier.

15. The apparatus of claim 14, wherein the identifying includes identifying at least one of: the allocating one or more of the plurality of RF processing from the first network to the second network, the ending the call on the second network, the updating the carrier aggregation capabilities of the UE with the serving base station, or
  determining to re-allocate bandwidth assigned to the UE.

16. The apparatus of claim 14, further comprising configuration of the at least one processor to generate an activation message, wherein the activation message is included in a media access control (MAC) control element.

* * * * *